United States Patent [19]

Tatsumi

[11] 4,292,660

[45] Sep. 29, 1981

[54] VARIABLE CAPACITOR

[75] Inventor: Tetsuo Tatsumi, Nagaokakyo, Japan

[73] Assignee: Murata Manufacturing Co., Ltd., Japan

[21] Appl. No.: 970,267

[22] Filed: Dec. 18, 1978

[30] Foreign Application Priority Data

Dec. 24, 1977 [JP] Japan .......................... 52/174805[U]
Mar. 27, 1978 [JP] Japan .......................... 53/39547[U]

[51] Int. Cl.³ .............................................. H01G 5/06
[52] U.S. Cl. .................................. 361/293; 361/278
[58] Field of Search ............................. 361/278, 293; 174/DIG. 8

[56] References Cited

U.S. PATENT DOCUMENTS

| | | | |
|---|---|---|---|
| 2,475,144 | 7/1949 | Kodama | 361/293 |
| 3,290,571 | 12/1966 | Robinson | 361/308 |
| 3,486,089 | 12/1969 | Wambach | 361/293 |
| 3,588,618 | 6/1971 | Otte | 174/DIG. 8 |
| 4,101,951 | 7/1978 | Kiuze | 361/278 |
| 4,179,722 | 12/1979 | Johanson | 361/293 |

FOREIGN PATENT DOCUMENTS 918826  10/1954  Fed. Rep. of Germany ...... 361/293

*Primary Examiner*—Elliot A. Goldberg
*Attorney, Agent, or Firm*—Ostrolenk, Faber, Gerb & Soffen

[57] ABSTRACT

A variable capacitor includes a generally cylindrical insulating case made of synthetic resin, with a stator terminal, which has springiness at its contact portion, insert-molded therein. A dielectric body, having a stator electrode formed thereon, is nonrotatably housed in the insulating case along with a rotatable metal rotor having a rotor electrode, and a non-rotatable rotor terminal. The rotor terminal has springiness at its contact portion and is formed with an aperture through which the metallic rotor may be rotated for adjustment.

11 Claims, 27 Drawing Figures

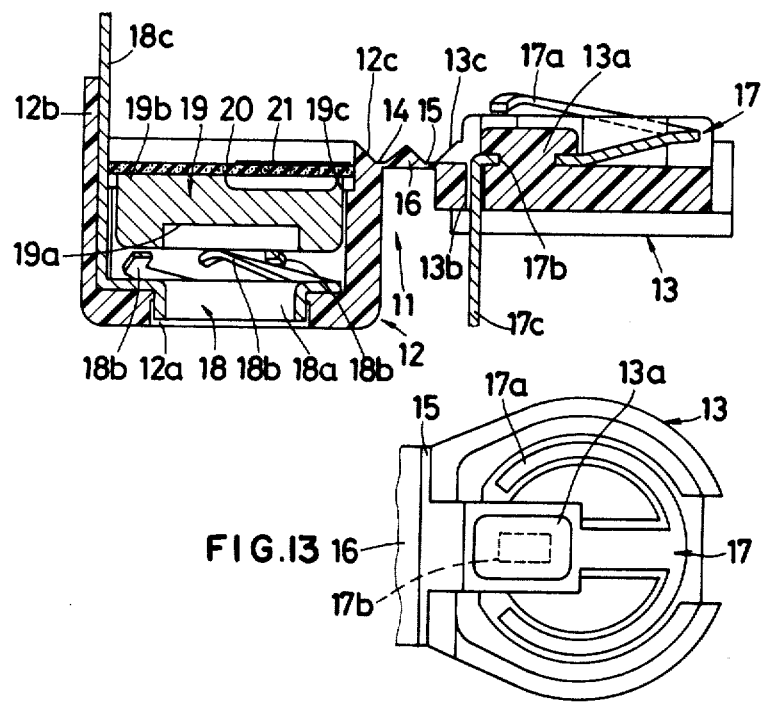
FIG. 12
FIG. 13
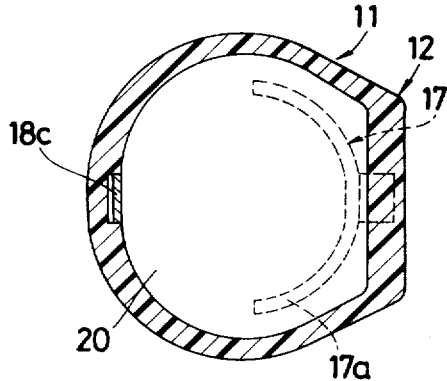
FIG. 14
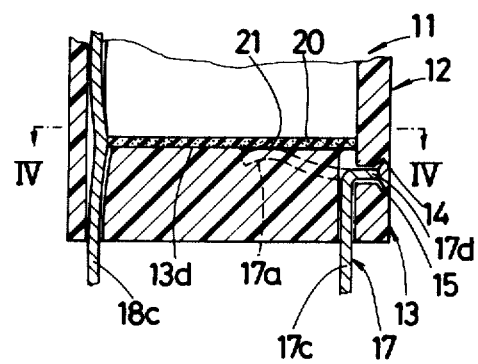
FIG. 15

VARIABLE CAPACITOR

BACKGROUND OF THE INVENTION

1. Field of the Invention

The present invention relates to a variable capacitor and more particularly to improvements therein for an increased stability of temperature characteristics of capacitance and for an increased capacitive efficiency, providing a structure which can be advantageously utilized in, e.g., a small trimmer capacitor.

2. Description of the Prior Art

The prior art of interest to the present invention is shown in FIG. 1. Referring to FIG. 1, the prior art variable capacitor comprises a cylindrical insulating cap 1 which houses a disc-like nonmetallic elastic member 2, a disc-like rotor electrode leading-out member 3 having a depending terminal portion 3a, a rotor electrode 4, a disc-like dielectric plate 5, and a disc-like stator 7 on which a semicircular stator electrode 6 having depending terminal portion 6a integral therewith is integrally formed to be flush therewith. A bottom opening 1a of cap 1 is integrally secured to an insulating base 8 having throughgoing apertures 8a for said rotor terminal portion 3a and stator terminal portion 6a.

Variable capacitors, such as the one described above, require a movable rotor electrode and a fixed, stator electrode, with a dielectric intervening therebetween. Accordingly, as shown in FIG. 1, the rotor electrode 4 and stator electrode 6 are disposed in opposed relation to each other with the dielectric plate 5 interposed therebetween, the rotor electrode 4 being rotatable, the stator electrode 6 being fixed. Such a conventional variable capacitor is disclosed in, e.g., U.S. Pat. No. 4,101,951 issued to Saburo Kuze on July 18, 1978 and assigned to Murata Manufacturing Co., Ltd., the assignee in the present application. This variable capacitor, however, exhibits the following drawbacks.

Since the electrodes are respectively disposed in contact with the main surfaces of the dielectric plate, there will be a slight clearance and therefore a layer of air between each electrode and the associated main surface of the dielectric plate. As a result, there is a decrease in capacitance. Further, since the layer of air varies in size with temperature variations, the temperature characteristics of the capacitor are unstable. Accordingly, considerably strict polishing has heretofore been necessary on the mutual contact surfaces of the dielectric plate and electrodes.

Further, with the arrangement shown in FIG. 1, it has been necessary to apply resin coatings to the throughgoing apertures 8a after the terminal portions 3a and 6a are passed through the throughgoing apertures 8a of the insulating base 8 since there is a danger of the flux flowing into the insulating cap 1 through the throughgoing apertures 8a when soldering the terminal portions 3a and 6a. The number of the component parts is large and the number of steps of assembly operation is increased, thus adding to the cost. The presence of a large number of places where the component parts contact each other has made it difficult to achieve accuracy in assembly and adjustment.

Since the dielectric plate 5 is not positively fixed but rotatable, it is possible that when the rotor electrode 4 is rotated for adjustment through an adjusting aperture 1b formed in the top lid of the insulating cap 1, the dielectric plate 5 will be broken off or cracked as it is concomitantly rotated.

While the variable capacitor has various problems, it has its merits which cannot be overlooked. More particularly, the rotor electrode 4 can be rotatably supported simply by being received in the cylindrical insulating cap 1, requiring no rotatable shaft member to be additionally provided. This is an important merit particularly in the case of a tiny trimmer capacitor. An arrangement including a rotatable shaft member for rotatably supporting the rotor electrode thereon would be relatively complicated, requiring additional component parts and additional steps of assembly operation therefor. It is therefore desired to solve the above-described problems while making use of the foregoing merits of the prior art. To this end, the variable capacitor of the present invention basically includes a rotor electrode supporting mechanism as shown in FIG. 1.

The problems described above are primarily caused by the fact that the dielectric plate is not positively fixed but concomitantly rotatable. If the dielectric plate is positively fixed, most of the foregoing problems are solved. Insofar as an arrangement wherein the dielectric plate is fixedly provided is concerned, a technique of interest is disclosed in U.S. Pat. No. 2,475,144 "Capacitor" issued to George T. Kodama et al on July 5, 1949. The capacitor disclosed therein has a plurality of combinations of capacitance, such as a fixed capacitance and a variable capacitance. Thus, the capacitor structure comprises a body of insulating material bearing connector or terminal elements for contact with stationary conductive plates on a dielectric plate which may be readily assembled with or disassembled from the body. For use as a fixed capacitor, a second stationary conductive plate is applied on another side of the dielectric, and, for use as a variable capacitor, a rotor plate member is held in contact with an unplated portion of the dielectric. Assembly of the parts is made simply by the interrelated shaping of the parts and the provision of a stop limiting relative movement of the parts in one direction. A resilient member presses and locks all the assembled elements in a given position in the body.

Stated in more detail by reference to the drawings attached to the above described Kodama et al patent, a body member 10 is prepared which is preferably formed with flanges 11 extending laterally a relatively large and material distance from the body and severally having a portion 12 extending at right angles to the flanges 11 and with flange edge portions 13 extending from the flange portions 12 toward each other, the several flange portions defining an open-ended groove with reentrant or undercut side walls. A rectangular dielectric member 30 is inserted into the open-ended groove of the body member 10 from one end thereof, where it is snuggly fitted and physically fixed. In this manner, the dielectric member 30 is fixedly installed.

The member 30 is first provided with plates 31 and 32 for a fixed capacitance and additionally with a plate 33 for forming a stator plate for a variable capacitance. It is to be noted that the plate 30 is of a casual nature in that it is provided in passing when the plates 31 and 32 for a fixed capacitance are formed. Thus, the major role of the dielectric member 30 is in any sense to form a fixed capacitance. The dielectric member 30 is protected by the body member 10. This manner of protection implies the fixedness of the dielectric member 30. The fixed state is further ensured by a presser member 41. A rotatable member 36 provided with a plate portion 37 which cooperates with the stator plate 33 formed on the dielectric member 30 to form a variable capacitor is rotatably mounted on the presser member 41 through a boss 38. Therefore, the rotatable member 36 inherently includes the boss 38 serving as a rotatable shaft.

Such arrangement will impair the merits of the variable capacitor having a cylindrical case shown in FIG. 1 described above. More particularly, it complicates the structure, increases the number of component parts and the number of steps of assembly operation and involves intricate manipulation in assembly operation. Therefore, it is not at all suitable for use as a variable capacitor structure such as a tiny trimmer capacitor. Further, the arrangement wherein the dielectric member 30 is inserted into the body member 10 in a direction in which its surface extends is not at all suitable for a variable capacitor with a cylindrical case such as the one shown in FIG. 1.

SUMMARY OF THE INVENTION

The present invention is directed to improvements in a structure wherein component parts are received in a cylindrical case, such as the one shown in FIG. 1, which is suitable for miniaturization, whereby the merits of a variable capacitor of this construction are utilized and other desirable characteristics are also provided.

In brief, the invention resides in a variable capacitor which comprises a cylindrical insulating case, a dielectric plate having two opposed main surfaces and nonrotatably received in said cylindrical case, a stator electrode formed directly on a portion of one of the main surfaces of the dielectric plate, a rotor electrode rotatably received in the cylindrical case in contact with a portion of the other main surface of the dielectric plate, whereby said rotor electrode is opposed to said stator electrode formed directly on a portion of said one main surface of said dielectric plate with said dielectric plate intervening therebetween, stator electrode leading-out means electrically connected to the stator electrode and led out from the cylindrical case, and rotor electrode leading-out means electrically connected to the rotor electrode and led out from the cylindrical case.

In a preferred embodiment of the invention, the stator electrode leading-out means is actualized in the form of a stator terminal having a region of contact with the stator electrode. The contact region has springiness, whereby it is urged into spring contact with the stator electrode. In this instance, it is preferable that the inner wall of the cylindrical case be formed with a portion which contacts one main surface of the dielectric plate over a relatively wide area and supports the same.

In another preferred embodiment of the invention, the cylindrical case is formed by insert-molding the stator terminal. The cylindrical case may be made of thermoplastic resin in the form of a bottomed cylinder, the size of the opening in the cylindrical case being so selected as to allow the insertion of the dielectric plate, rotor electrode and rotor electrode leading-out means. After said insertion, the end edge of the opening in the cylindrical case is heated and inwardly bent, whereby the dielectric plate, rotor electrode and rotor electrode leading-out means are retained in the cylindrical case.

Accordingly, a principal object of the invention is to improve the quality of contact between a stator electrode and a dielectric in a variable capacitor of the type in which component parts are received in a cylindrical case.

Another object of the invention is to provide a variable capacitor of a construction which is capable of preventing the instrusion of a flow of flux into the capacitor which would otherwise be caused when the capacitor is soldered to another part.

A further object of the invention is to provide a variable capacitor of a construction which is capable of reducing the number of parts and the number of steps of assembly operation.

An additional object of the invention is to provide a variable capacitor of a construction which is capable of preventing damage to the dielectric.

Yet another object of the invention is to provide a variable capacitor wherein the number of places where component parts contact each other is reduced, accuracy of adjustment in assembly operation can be easily achieved and hence a stabilized quality is obtained.

These and other objects and features of the invention will become more apparent from the following detailed description when read in connection with the accompanying drawings.

BRIEF DESCRIPTION OF THE DRAWINGS

FIGS. 2A through 6C illustrate an embodiment of the present invention, in which FIG. 2A is a plan view of an insulating case;

FIG. 4 is a bottom view of a metallic rotor; FIG. 5A is a plan view of a rotor terminal; FIG. 6C is a section taken along the line C—C of FIG. 6A;

FIGS. 7 through 13 illustrate a second embodiment of the invention, in which FIG. 7 is a front view, in longitudinal section, of a completed variable capacitor; FIG. 8 is a side view, in longitudinal section, of the same; FIG. 9 is a plan view of the same; FIG. 10 is a bottom view of the same; FIG. 11 is an exploded view, illustrating how to assemble the variable capacitor shown in FIGS. 7 through 10; FIG. 12 shows the elements received in the insulating case; and FIG. 13 is a plan view of the right-hand half of FIG. 12;

FIGS. 14 and 15 illustrate a further embodiment of the invention, in which FIG. 14 is a section taken along the line IV—IV of FIG. 15; and FIG. 15 is a fragmentary longitudinal section;

FIGS. 16 and 17 illustrate an additional embodiment of the invention, in which FIG. 16 is a plan view corresponding to FIG. 13; and FIG. 17 is a fragmentary longitudinal section;

FIGS. 18 through 20 illustrate yet another embodiment of the invention, in which FIG. 18 is a longitudinal section of a completed variable capacitor; FIG. 19 is a plan view showing the arrangement of the base; and FIG. 20 is a longitudinal section showing the arrangement of the base;

FIGS. 21 and 22 illustrate still a further embodiment of the invention, in which FIG. 21 is a section taken along the line I—I of FIG. 22; and FIG. 22 is a fragmentary longitudinal section.

DESCRIPTION OF THE PREFERRED EMBODIMENTS

Embodiments of the invention will now be described with reference to the accompanying drawings.

Figure 2A:
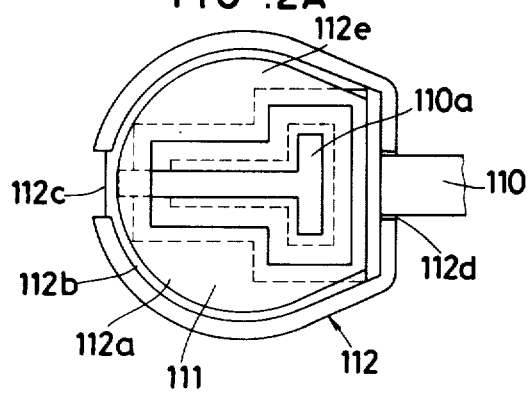
Figure 2B:
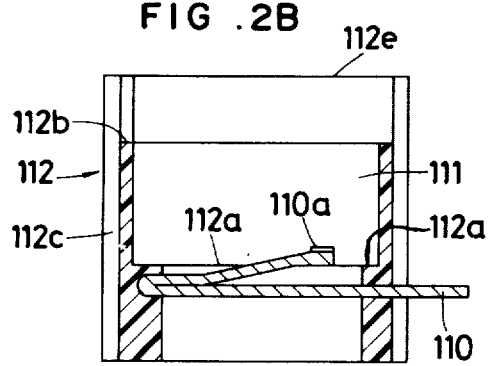
FIG. 2B is a longitudinal section of FIG. 2A.

As shown in FIGS. 2A and 2B, a stator electrode leading-out member or stator terminal 110 bent in approximately U-shape and having springiness at its narrow contact region 110a is insert-molded in the bottom of an insulating case 112 made of, e.g., glass fiber-reinforced thermoplastic synthetic resin molded into a bottomed cylinder having a horseshoe-shaped or noncircular fitting recess 111.

The fitting recess 111 of the insulating case 112 is formed with a flat bottom surface 112a at a level slightly lower than the free height of the contact region 110a of the stator terminal, a notched shoulder 112b disposed adjacent an opening 112e, and axially extending grooves 112c and 112d disposed respectively on the arc top and flat portion of the outer surface of the insulating case 112.

Since the stator terminal 110 is insert-molded in the manner described, the provision of the throughgoing apertures 8a (FIG. 1) becomes unnecessary, so that there is no danger of a flow of flux intruding into the capacitor.

Figure 3A:
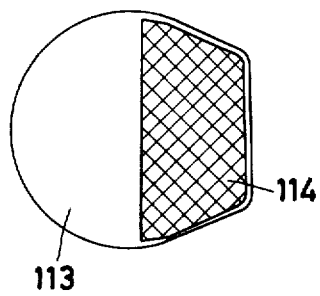
FIG. 3A is a bottom view of a dielectric.
Figure 3B:
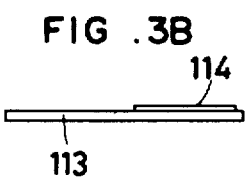
FIG. 3B is a side view of FIG. 3A.

As shown in FIGS. 3A and 3B, a horseshoe-shaped or noncircular dielectric plate 113 adapted to be fitted in the fitting recess 111 of the insulating case 112 is in the form of a thin plate of, e.g., ceramics, and it is provided with a stator electrode 114 formed by vacuum deposition of silver on a portion of its surface, shown by crosshatching, which contacts the contact region 110a of the stator terminal 110.

Since the stator electrode 114 is made integral with the dielectric plate 113 in the manner described, the quality of contact of the stator electrode 114 with the dielectric plate 113 is improved, providing an increased capacitance and obviating the necessity of lapping the stator 7 (FIG. 1) as in the prior art, and there is no possibility of unstable contact otherwise caused by a difference in expansion coefficient due to air pockets. In addition, since the dielectric plate 113 will not be rotated when fitted in the insulating case 112, there is no danger of it being broken or cracked as in the prior art.

Figure 4A:
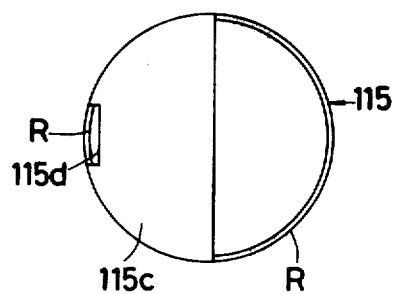
Figure 4B:
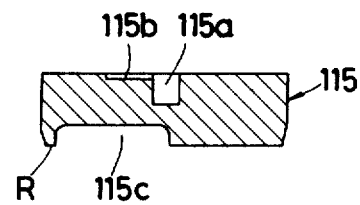
FIG. 4B is a side view, in longitudinal section, of FIG. 4A.

Further, as shown in FIGS. 4A and 4B, a disc-like metallic rotor 115 adapted to be rotatably fitted in the fitting recess 111 of the insulating case 112 is made of good conductor metal of low expansion coefficient, such as nickel alloy or brass, and its upper and lower surfaces are smooth surfaces of high precision lapped or polished so as to improve the quality of contact with the dielectric plate 113 and improve contact slidability and electric conductivity with respect to a rotor terminal to be later described.

The upper surface of the metallic rotor 115 is provided with a screwdriver slot 115a and an arrow-shaped impression 115b (see FIG. 6A) for judgment of directionality, while its lower surface is provided with a semicircular recess 115c for control of capacitance. The top of the end edge of said recess 115c is provided with a projection 115d flush with the lower surface.

Because of the provision of the recess 115c, when the metallic rotor 115 is rotated, the area opposed to the stator electrode 114 through the dielectric plate 113, and hence the capacitance, can be varied. In addition, the smaller the shape of the projection 115d, the smaller the minimum capacitance which can be set.

The lower surface of the metallic rotor 115 will have its outer periphery edged as a result of lapping or other machining, but if it is chamfered as at R (FIG. 4A), this facilitates the fitting of the metallic rotor into the insulating case 112 and prevents it from scratching the inner wall surface of the insulating case 112 or from floating up while it is rotated for adjustment.

Figure 5:
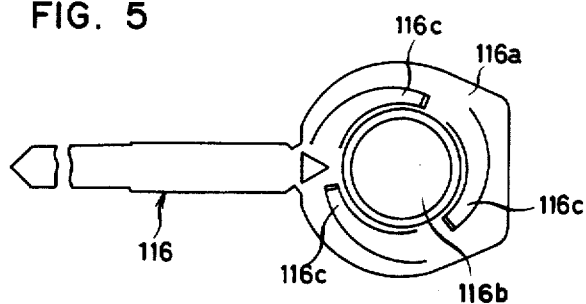

As shown in FIG. 5, a rotor electrode leading-out member or rotor terminal 116 has a horseshoe-shaped wide portion 116a adapted to be supported on the notched shoulder 112b (FIG. 6C) when it is fitted in the fitting recess 111 of the insulating case 112. Rotor terminal 116 has a rotation adjustment aperture 116b upwardly punched out to permit a screwdriver to be inserted through aperture 116b to engage slot 115a when the angular orientation of metallic rotor 115 is to be adjusted. Portions of rotor terminal 116 also are downwardly punched out at three places around aperture 116b in such a manner as to form contact portions 116c (FIGS. 6B, 6C) having stronger springiness than the contact portion 110a of the stator terminal 110. In addition, the wide portion 116a may not be provided with such contact portions 116c, and instead, a separate coil spring may be installed.

In assembling the capacitor, the dielectric plate 113 is first placed into fitting recess 111, with its stator electrode 114 directed downward, via, from the opening 112e in the insulating case 112, whereupon the dielectric plate 113 is held nonrotatable because of its horseshoe-shape, with the stator electrode 114 contacting the contact portion 110a of the stator terminal 110 (insert molded in case 112). The dielectric plate 113 is ultimately positioned on the bottom 112a of the insulating case 112 when depressed by contact portions 116c against the spring force of the contact portion 110a.

Next, the metallic rotor 115 with its recess 115c directed downward is placed into fitting recess 111. Rotor 115 is rotatable because of its circular shape and is stably positioned with its lower surface and projection 115d abutting the upper surface of the dielectric plate 113.

Subsequently, the wide portion 116a of rotor terminal 116, with its contact portions 116c directed downward, is placed into fitting recess 111, whereupon rotor terminal 116 is held nonrotatable because of its horseshoe shape. In this position, contact portions 116c contact the upper surface of the metallic rotor 115 and bias rotor 115 downwardly as a result of their spring force. The wide portion 116a is held in position abutting notched shoulder 112b by the horizontally extending upper end 112f of case 112.

Figure 6A:
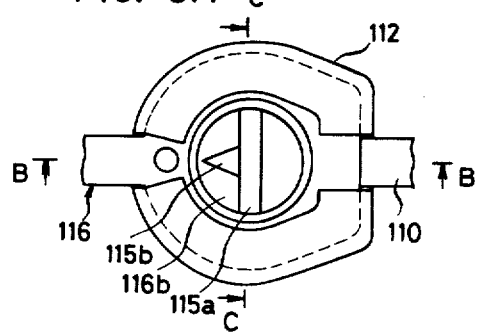
FIG. 6A is a plan view of a completed variable capacitor.
Figure 6C:
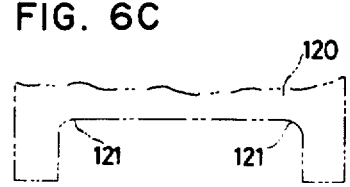
Figure 6B:
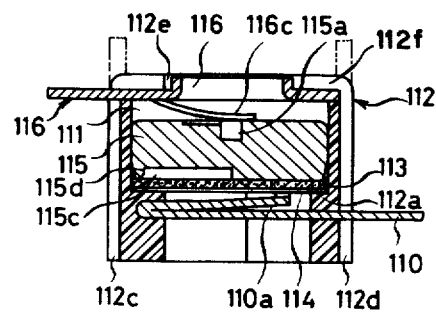
FIG. 6B is a section taken along the line B—B of FIG. 6A.
Figure 6B:
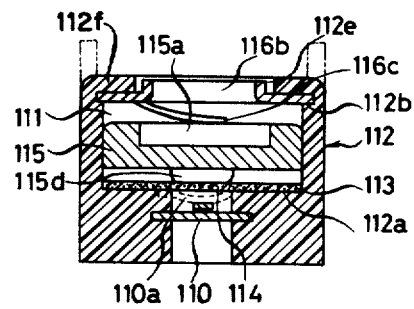

When elements 115 and 116 are placed in case 112, end 112f extends vertically upward, as shown in phantom lines in FIGS. 6A and 6C. In order to close case 112 and place end 112f in its horizontal position, a heated punch 120, shown in phantom lines in FIG. 6C, is used. This punch 120 has rounded portions 121 on its inner surface. Therefore, when the heated punch 120 is pressed against the insulating case 112, the upper end 112f is softened and inwardly deformed along the rounded portions 121. It is deformed to surround the peripheral edge of the wide portion 116a of the rotor terminal 116. Thereafter, it is allowed to cool and set, whereupon the rotor terminal 116 is nonremovably held with respect to the insulating case 112, thereby completing the assembly operation. This state is shown in FIGS. 6A, 6B and 6C. Thereafter, rotor terminal 116 may be bent to fit in one groove 112c (FIG. 2A) and the stator terminal 110 bent to fit in the other groove 112d of the insulating case 112, as desired.

When the assembly is thus completed, the contact portions 116c of the rotor terminal 116 are in contact with the upper surface of the metallic rotor 115 to maintain electrical conductivity at the same time depressing the metallic rotor 115 by their spring force. The lower surface of metallic rotor 115, in turn, abuts dielectric plate 113 to depress the latter, and the lower surface of dielectric plate 113, in turn, abuts the relatively wide bottom 112a of the insulating case 112, so that it is held in a depressed position. In this position, the stator electrode 114 on the lower surface of the dielectric plate 113 is in contact with contact portion 110a of stator terminal 110 biased against the spring force thereof.

A screwdriver or other adjusting means is inserted into the screwdriver slot 115a through the rotation adjustment aperture 116b of the rotor terminal 116 to rotate the rotor electrode 115 so as to vary the opposed area between the latter and the stator electrode 114, thereby varying the capacitance.

Figure 1:
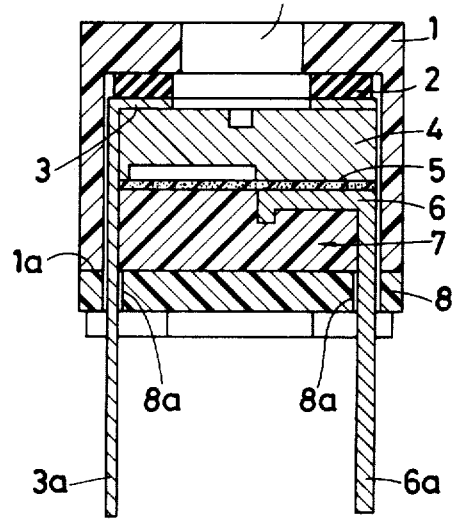
FIG. 1 is a longitudinal section of a prior art variable capacitor of interest to the present invention.

As is apparent from the foregoing description, since this embodiment includes the insulating case 112 having the stator terminal 110 including springy contact portion 110a insert-molded therein, there are no throughgoing apertures 8a shown in FIG. 1. As a result, the instrusion of a flow of flux can be prevented without the application of resin coatings. If such merit is not desired, the following embodiment is possible. This embodiment is shown in FIGS. 7 through 13.

Figure 11:
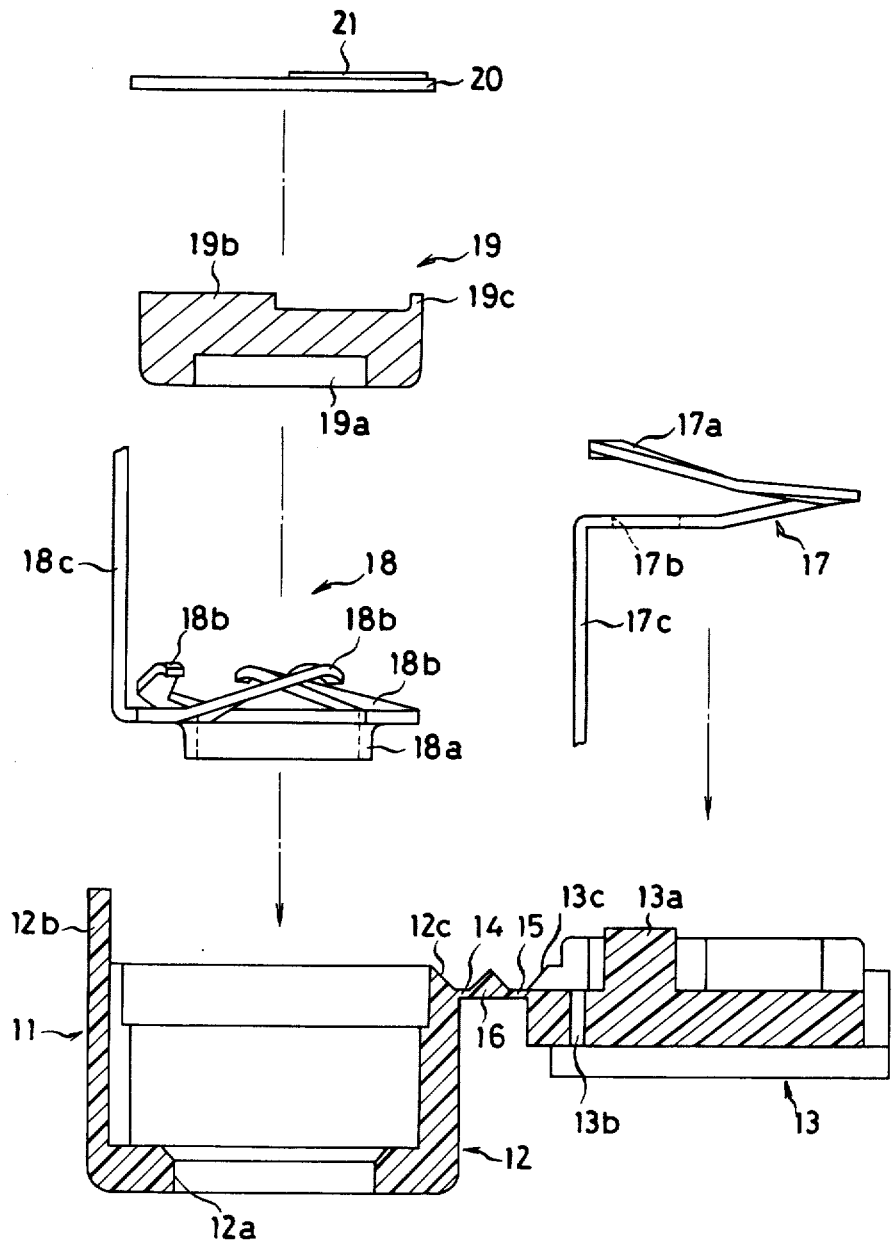

Referring to FIG. 11, the components of the variable capacitor shown therein will be described in the order of assembly operation.

A cylindrical insulating case 11 includes a case cap 12 and a case base 13, which are connected together by two thin hinge connections 14 and 15 and a thick portion 16 disposed therebetween. Insulating case 11 is made of flexible synthetic resin and molded in one piece. The cap 12 constitutes a container and is provided with a throughgoing aperture 12a. It is also provided with a projecting edge 12b for supporting a portion of the base 13 through a rotor terminal 18c to be later described. The base 13 constitutes a lid and is provided with a projection 13a for fixing a stator terminal leading-out member 17 to be later described and a throughgoing aperture 13b for receiving a stator terminal 17c. The cap 12 and the base 13 are respectively provided with notches 12c, 13c for receiving the thick portion 16 formed between the hinge connections 14 and 15.

A rotor electrode leading-out member 18 includes spring contact portions 18b formed by being cut from a ring-like portion 18a which is adapted to be fitted in throughgoing aperture 12a. The spring contact portions 18b are circumferentially equispaced and adapted to contact a metallic rotor 19 to be later described. A rotor terminal 18c is integral with and extends from the ring-like portion 18a.

The lower surface of the metallic rotor 19, as seen in FIG. 11, is provided with a screwdriver slot 19a while its upper surface is formed with a semicircular step portion which serves as a rotor electrode 19b. Further, the upper surface of the metallic rotor 19 is provided with an embankment-like projection 19c flush with said rotor electrode 19b for stabilizing the state of contact between the metallic rotor 19 and a dielectric plate 20 to be described below.

Figure 9:
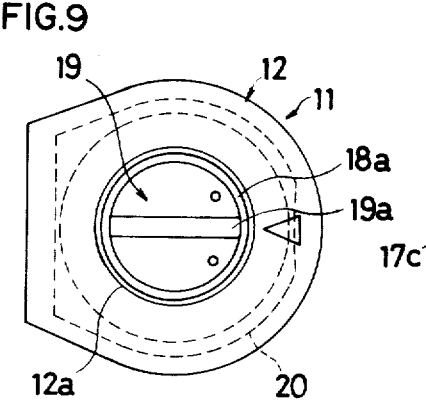
Figure 10:
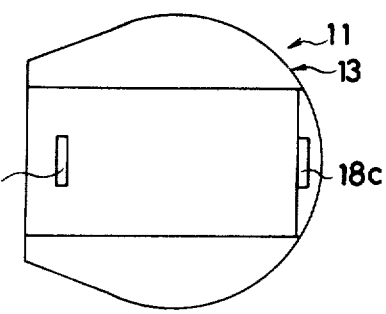

The dielectric plate 20, which is a characteristic element of the invention, is made of, e.g., ceramics and a semicircular stator electrode 21 formed on its upper surface as by metallizing process. As shown in FIG. 9, the plane figure of the dielectric plate 20 (shown in a broken line) is noncircular.

The rotor electrode leading-out member 18, metallic rotor 19 and dielectric plate 20, described above, are successively inserted in the cap 12 of the insulating case 11. This state is best seen in the left-hand half of FIG. 12. In addition, while the dielectric plate 20 has a noncircular plane figure, as described above, the cap 12 which receives it is shaped to coincide therewith and hence the noncircular dielectric plate 20 is prevented from being rotated in the cap 12.

The stator electrode leading-out member 17 for leading out the stator electrode 21 which is formed directly on the surface of the dielectric plate 20 as described above includes a spring contact portion 17a and its plane figure, as best seen in FIG. 13, is C-shaped. The spring contact portion 17a is adapted to be in spring contact with the stator electrode 20. A throughgoing aperture 17b is provided for attaching the stator electrode leading-out member 17 to the base 13 of the insulating case 11 and serves to receive said projection 13a. The stator terminal 17c is integral with and extends from the spring contact portion 17a.

The stator electrode leading-out member 17 is adapted to be fixed to the base 13. More particularly, the projection 13a is received in the throughgoing aperture 17b while inserting the stator terminal 17c into the throughgoing aperture 13b, whereupon the front end of said projection 13a is crimped as by heat or ultrasonic waves so as to be deformed into a shape shown in the right-hand half of FIG. 12, thereby fixing the stator electrode leading-out member 17 in position.

Figure 7:
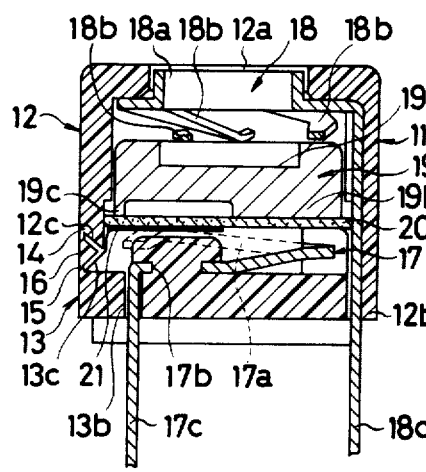
Figure 8:
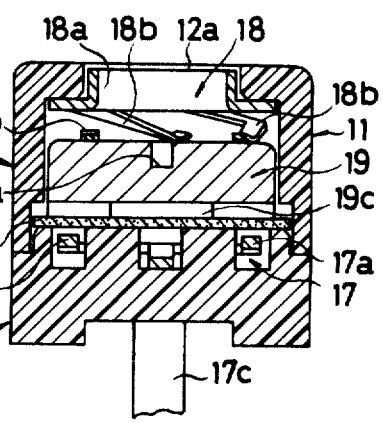

In this way, an intermediate state in the assembly operation shown in FIG. 12 is obtained. From this state, the case base 13 is rotated through the hinge connections 14 and 15 until it is positioned on the case cap 12, whereupon the two are united together as by fusion using heat or ultrasonic waves, thereby providing the completed variable capacitor shown in FIGS. 7 through 10. Alternatively, base 13 and cap 12 may be united by mechanical fixing means, such as resilient hooks, or by an adhesive agent. When they are united together in this manner, the rotor terminal 18c is led out from between the projecting edge 12b of the cap 12 and the base 13. In the foregoing variable capacitor, the only movable part is the metallic rotor 19, and the rotor electrode 21, dielectric plate 20 and stator electrode 21, which form a capacitance, are pressed against each other by the spring contact portions 17a and 17b. Also, the rotor electrode 19b is led out by the rotor terminal 18 through the spring contact portions 18b contacting the metallic rotor 19 and through the ring-like portion 18a, while the stator electrode 21 is led out by the stator terminal 17c through the spring contact portion 17a contacting the stator electrode. In addition, the state shown in FIG. 7 is such that a minimum capacitance in the capacitance-varying range is formed. If the metallic rotor 19 is rotated by about 180° from this state, the opposed area between the rotor electrode 19b and the stator electrode 21 is increased to a maximum, providing a maximum capacitance.

It will be seen from this embodiment that the stator electrode 21 is formed directly on the dielectric plate 20 and that the stator electrode 21 is led out by the stator terminal 17c through the spring contact portion 17a contacting the stator electrode.

Other embodiments of the invention which are concerned with the leading-out of the stator electrode formed directly on the dielectric plate will now be described with reference to the drawings.

In FIGS. 14 and 15 and in FIGS. 16 through 22 to be later described, the parts which correspond to those shown in FIGS. 7 through 13 are designated by like reference characters.

Referring to FIGS. 14 and 15, the semicircular spring contact portion 17a of a stator electrode leading-out member 17 is in spring contact with a stator electrode 21 which is formed directly on the lower surface of a dielectric plate 20. See FIG. 15. Spring contact portion 17a extends around a pedestal 13d which is formed in case base 13 and which contacts the lower surface of the dielectric plate 20 over a relatively wide area. The stator electrode leading-out member 17 is fixed in place by a locking lug 17d extending at right angles to the stator terminal 17c, said locking lug 17d being clamped between a case cap 12 and case base 13 which are connected together by the hinge connections 14 and 15 of an insulating case 11. The dielectric plate 20 is noncircular, so that when it is disposed in the insulating case 11, its rotation is prevented. The fixed state of the dielectric plate 20 is further stabilized in that the rotor terminal 18c is bent so as to press the dielectric plate 20.

Figure 16:
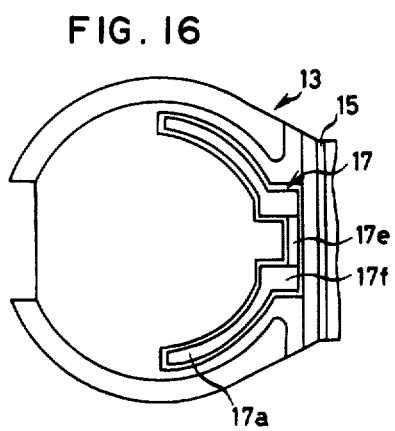
Figure 17:
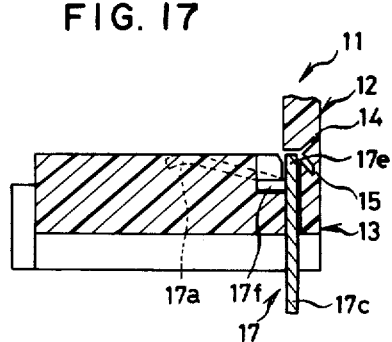

Referring to FIGS. 16 and 17, in an embodiment shown therein, a stator terminal 17c is contacted at its end 17e with the lower end edge of a case cap 12, and the lower surface of a locking lug 17f extending from the stator terminal 17c at right angles thereto is contacted with a case base 13, whereby the stator electrode leading-out member 17 is fixed in an insulating case 11. In addition, in FIGS. 16 and 17, the illustration of the dielectric plate, etc., are omitted.

Figure 18:
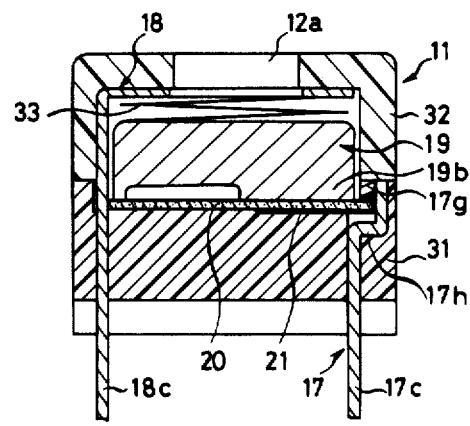
Figure 19:
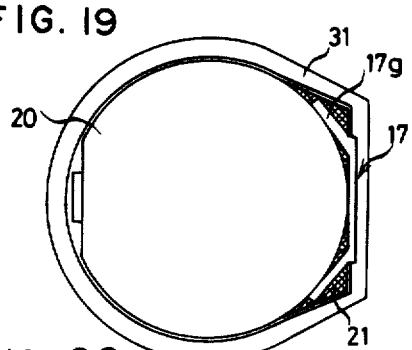
Figure 20:
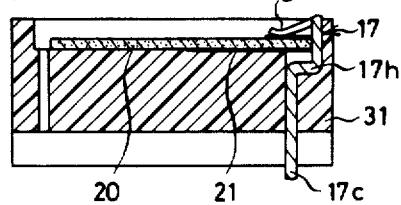

Referring to FIGS. 18 through 20, in a variable capacitor shown therein, an insulating case 11 is composed of two parts, a case base 31 and a case cap 32. Therefore, the case base 31 and case cap 32 are separately prepared and not hinge-connected. In contrast thereto, in the embodiment described above, since the container portions of the split insulating case 11 are hinge-connected, the number of parts and the number of steps of assembly operation can be reduced and there is no need to position one container portion relative to the other during the assembly operation, thus facilitating the assembly operation. If such merit is not desired, the arrangement shown therein may be used to construct the insulating case 11, which means that the present invention is also applicable to a variable capacitor having such insulating case 11. In the embodiment described with reference to FIGS. 7 through 13, the rotor electrode leading-out member 18 has been integrally formed with the ring-like portion 18a, spring contact portion 18b and rotor terminal 18c, but in this embodiment the portion corresponding to the ring-like portion and the portion corresponding to the spring contact portion are separate parts. More particularly, a separate spring washer 33 is prepared. Thus, the arrangement shown therein is somewhat different from the previously described variable capacitors. It is to be pointed out, however, that the characteristic arrangement of this embodiment to be described below is, of course, applicable to the previously described type of variable capacitors.

The characteristic arrangement of the embodiment resides in the fact that the stator electrode 21 is formed on the dielectric plate 20 to extend up to a portion of the upper surface thereof. In addition, the stator electrode 21 is, of course, so formed that on the upper surface of the dielectric plate 20 it does not contact the rotor electrode 19b or metallic rotor 19. The stator electrode 21 is led out from the upper surface of the dielectric plate 20, and to this end, the stator electrode leading-out member 17 is provided with a spring contact portion 17g which is in spring contact with the stator electrode 21. The state of contact is best shown in FIGS. 19 and 20. Further, the stator terminal 17c is provided with a step portion 17h, so that when the case base 31 and case cap 32 are joined together, the lower surface of the step portion 17h and the upper end surface of the stator terminal 17c are clamped between the two members, whereby the stator electrode leading-out member 17 is fixed in the insulating case 11.

Figure 21:
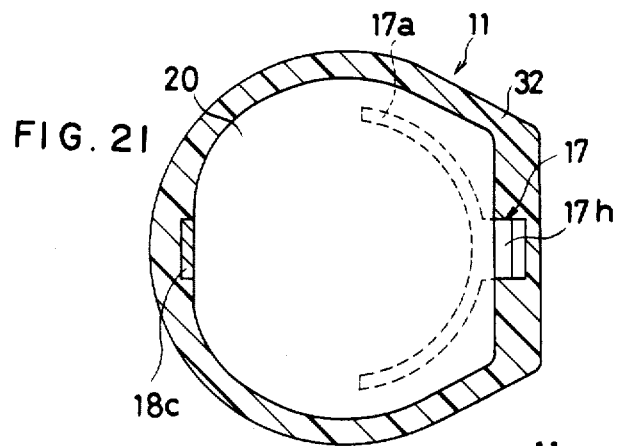
Figure 22:
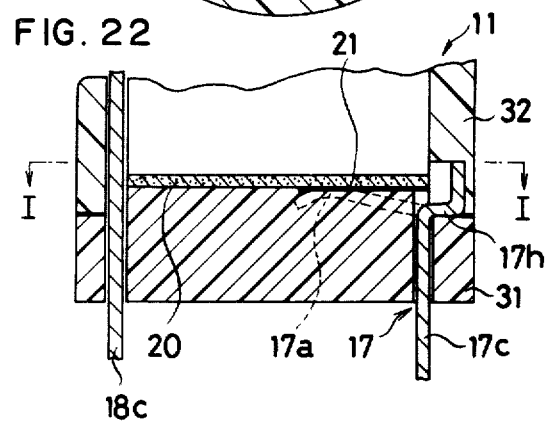

Referring to FIGS. 21 and 22, a variable capacitor shown therein has an insulating case of the arrangement shown in FIGS. 18 through 20. This embodiment is the same as the embodiment shown in FIGS. 18 through 20 including the arrangement for fixing the stator electrode leading-out member 17, except that the spring contact portion 17a is disposed on the lower surface of the dielectric plate 20.

Figure 23:
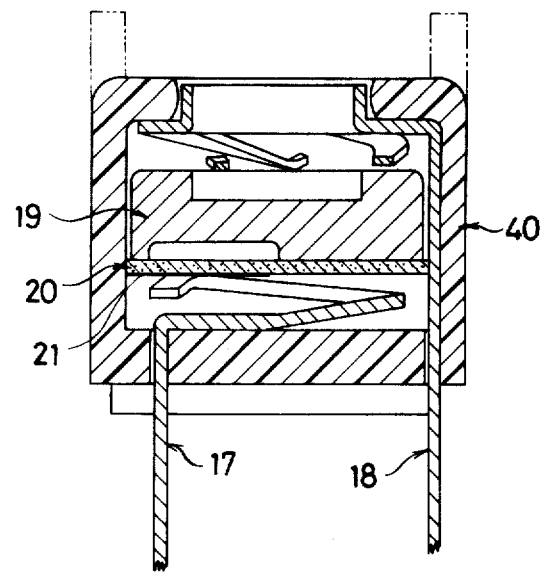
FIG. 23 is a longitudinal section showing another embodiment of the invention.

FIG. 23 shows an embodiment of the invention including an insulating case 40 of thermoplastic synthetic resin, the thermoplasticity of said insulating case 40 being utilized. In addition, the components received in the insulating case 40 in this embodiment may be the same as those described with reference to FIGS. 7 through 13. Therefore, in FIG. 23, the parts corresponding to those shown in FIGS. 7 through 13 are designated by like reference characters.

Referring to FIG. 23, the insulating case 40 is in the form of a bottomed cylinder, and initially it is prepared with the upper end edge of the opening rising as shown in phantom lines. A stator electrode leading-out member 17, dielectric plate 20, metallic rotor 19 and rotor electrode leading-out member 18 are successively inserted into the insulating case 40 in the direction shown in FIG. 23, so that they are successively piled up from the bottom. The upper end edge of the insulating case 40 is heated, softened and inwardly deformed to surround the rotor electrode leading-out member 18, whereupon it is allowed to cool and set, as described in FIG. 6C. The components in the insulating case are held in this manner to complete the assembly operation.

The embodiment shown in FIG. 23, like the previously described embodiment shown in FIGS. 2A through 6C, uses an integral insulating case which initially has a large opening, which facilitates the assembly operation. Further, a case body shaped to prevent the components received therein from slipping off can be easily obtained by simply pressing the upper end edge of the insulating case 40 while heating the same. Also, the number of parts is reduced.

In the various embodiments described above, the stator electrode has been led out by the spring contact portion which is in spring contact therewith, but the invention is not limited thereto. For example, a lead may be electrically connected to the stator electrode by soldering or by electrically conductive paint.

In the above embodiments, metallizing has been performed to form the stator electrode directly on the dielectric plate, but the invention is not limited thereto.

For example, plating or the pasting of a metal foil is possible.

Further, in the above embodiments, the dielectric plate and the part which receives it have been made noncircular in order to prevent the rotation of the dielectric plate, but the invention is not limited thereto. For example, the outer peripheral edge of the dielectric plate may be serrated or the dielectric plate may be formed with an aperture, which may be utilized to fix the dielectric plate in position. Further, if the stator terminal is fixed to the stator electrode by soldering or by electrically conductive paint, such rotation preventing means becomes unnecessary.

Although the present invention has been described and illustrated in detail, it is clearly understood that the same is by way of illustration and example only and is not to be taken by way of limitation, the spirit and scope of the present invention being limited only by the terms and the appended claims.

What is claimed is:

1. A variable capacitor, comprising:
    a generally cylindrical insulating case;
    a dielectric plate non-rotatably housed in said cylindrical case and having first and second opposed main surfaces, said insulating case having a bottom inner wall surface contacting said first main surface of said dielectric plate over a substantial area thereof such that said inner wall surface defines a structural support seat for said dielectric plate;
    a stator electrode formed directly on a portion of said first main surface of said dielectric plate;
    a rotor electrode rotatably housed in said cylindrical case and disposed in contact with a portion of said second main surface of said dielectric plate such that said rotor electrode is opposed to said stator electrode and is separated therefrom by said dielectric plate;
    stator electrode leading-out means electrically connected to said stator electrode and extending outside said cylindrical case, said stator electrode leading-out means including a stator terminal having a resilient contact portion which is spring biased into contact with said stator electrode, said bottom inner wall surface having a recess formed therein which accommodates said resilient contact portion such that said resilient contact portion may be spring biased into contact with said stator electrode;
    rotor electrode leading-out means electrically connected to said rotor electrode and extending outside said cylindrical case; and
    a spring member which presses said rotor electrode against said second main surface or said dielectric plate and thereby presses said dielectric plate against said bottom inner wall surface of said cylindrical case, the spring force of said spring member being higher than the spring force exerted on said stator electrode by said resilient contact portion of said stator terminal such that said dielectric member is maintained in engagement with said inner wall surface of said cylindrical case by said spring member.

2. A variable capacitor, comprising:
    a generally cylindrical insulating case;
    a dielectric plate non-rotatably housed in said cylindrical case and having first and second opposed main surfaces, said insulating case having a bottom inner wall surface contacting said first main surface of said dielectric plate over a substantial area thereof such that said inner wall surface defines a structural support seat for said dielectric plate;
    a stator electrode formed directly on a portion of said first main surface of said dielectric plate;
    a rotor electrode rotatably housed in said cylindrical case and disposed in contact with a portion of said second main surface of said dielectric plate such that said rotor electrode is opposed to said stator electrode and is separated therefrom by said dielectric plate;
    stator electrode leading-out means electrically connected to said stator electrode and extending outside said cylindrical case, said stator electrode leading-out means including a stator terminal having a resilient contact portion which is spring biased into contact with said stator electrode, said bottom inner wall surface having a recess formed therein which accommodates said resilient contact portion such that said resilient contact portion may be spring biased into contact with said stator electrode;
    rotor electrode leading-out means electrically connected to said rotor electrode and extending outside said cylindrical case;
    said stator terminal being embedded in said cylindrical case in the area of said recess; and
    a spring member which presses said rotor electrode against said second main surface or said dielectric plate and thereby presses said dielectric plate against said bottom inner wall surface of said cylindrical case, the spring force of said spring member being higher than the spring force exerted on said stator electrode by said resilient contact portion of said stator terminal such that said dielectric member is maintained in engagement with said inner wall surface of said cylindrical case by said spring member.

3. A variable capacitor as set forth in claim 1 or 2, wherein the rotation of said dielectric plate is prevented by its configurational relation to said cylindrical case.

4. A variable capacitor as set forth in claim 3, wherein said dielectric plate has a noncircular plane figure, while said cylindrical case has a noncircular portion adapted to receive said noncircular dielectric plate.

5. A variable capacitor as set forth in claim 3, wherein said dielectric plate has serrations, while said cylindrical case has serrations engageable with said serrations of said dielectric plate.

6. A variable capacitor as set forth in claim 2, wherein said stator terminal is inserted in said cylindrical case after the latter is pre-molded.

7. A variable capacitor as set forth in claim 1 or 2, wherein:
    said cylindrical case is made of thermoplastic resin in the form of a bottomed cylinder having an opening in the tap thereof,
    the opening in said cylindrical case is so selected as to allow the insertion of said dielectric plate, said rotor electrode and said rotor electrode leading-out means, and
    after said insertion, the edge of said opening in said cylindrical case is heated and inwardly bent, whereby said dielectric plate, said rotor electrode and said rotor electrode leading-out means are retained in said cylindrical case.

8. A variable capacitor as set forth in claim 2, wherein:

said cylindrical case is made of thermoplastic resin in the form of a bottomed cylinder having an opening in the tap thereof, the opening in said cylindrical case is so selected as to allow the insertion of said dielectric plate, said rotor electrode and said rotor electrode leading-out means, and after said insertion, the end edge of said opening in said cylindrical case is heated and inwardly bent, whereby said dielectric plate, said rotor electrode and said rotor electrode leading-out means are retained in said cylindrical case.

9. A variable capacitor as set forth in claim 6, wherein:

said cylindrical case is made of thermoplastic resin in the form of a bottomed cylinder, the opening in said cylindrical case is so selected as to allow the insertion of said dielectric plate, said rotor electrode, said stator terminal and said rotor electrode leading-out means, and after said insertion, the end edge of said opening in said cylindrical case is heated and inwardly bent, whereby said dielectric plate, said rotor electrode, said stator terminal and said rotor electrode leading-out means are retained in said cylindrical case.

10. A variable capacitor as set forth in claim 1, wherein said cylindrical case is formed in two parts, an opening in at least one of said two parts being of sufficient size to permit the insertion of said dielectric plate into said case.

11. A variable capacitor as set forth in claim 10, wherein said two parts are hinge-connected.

* * * * *